United States Patent [19]

Scaglione et al.

[11] Patent Number: 4,735,808

[45] Date of Patent: Apr. 5, 1988

[54] DIETETIC DOG BISCUITS CONTAINING VEGETABLE HULLS

[75] Inventors: Felice Scaglione, Hasbrouck Heights, N.J.; Gary Gellman, Pomona, N.Y.

[73] Assignee: Nabisco Brands, Inc., Parsippany, N.J.

[21] Appl. No.: 723,812

[22] Filed: Apr. 16, 1985

[51] Int. Cl.⁴ .............................................. A21D 13/00
[52] U.S. Cl. .................................. 426/62; 426/549; 426/623; 426/805
[58] Field of Search ............... 426/804, 805, 549, 623, 426/630, 635

[56] References Cited

U.S. PATENT DOCUMENTS

| | | | |
|---|---|---|---|
| 1,054,695 | 6/1912 | Levin | 426/549 |
| 1,199,622 | 9/1916 | Sheppard | 426/630 |
| 1,627,921 | 3/1927 | Miner | 426/630 |
| 1,695,567 | 12/1928 | Weber | 426/549 |
| 1,776,055 | 9/1930 | Weber | 426/549 |
| 3,573,061 | 3/1971 | Glabe | 426/804 |

FOREIGN PATENT DOCUMENTS

| | | | |
|---|---|---|---|
| 66957 | 4/1985 | Japan | 426/549 |
| 321965 | 5/1928 | United Kingdom | 426/805 |

OTHER PUBLICATIONS

De Gouy, 1944, The Bread Tray, Greenberg Publishers, New York, pp. 44-49.
The American Heritage Dictionary, 1982, Houghton Mifflin Co., Boston, Mass.

Primary Examiner—Raymond N. Jones
Assistant Examiner—Carolyn Paden
Attorney, Agent, or Firm—Richard Kornutik

[57] ABSTRACT

This invention discloses a low calorie dietetic dog biscuit containing vegetable hulls. The vegetable hulls are fibrous components and reduce the overall caloric content of the biscuits to between about 320 and 330 calories per 100 grams of said biscuit. The biscuits can use a blend of proteinaceous and farinaceous ingredients such that the overall protein content of the biscuits is reduced when compared to standard dog biscuits. The preferred embodiment is a low calorie dog biscuit including rice hulls.

15 Claims, No Drawings

DIETETIC DOG BISCUITS CONTAINING VEGETABLE HULLS

BACKGROUND OF THE INVENTION

1. Field of the Invention

This invention relates to the production of dietetic dog biscuits. In particular, this invention relates to dietetic dog biscuits containing vegetable hulls which are used to selectively balance the nutritional composition of the biscuit and make the biscuit low in calories, low in total protein, high in essential amino acids, high in fiber, or a combination of these.

2. Description of the Prior Art

Many pet owners are concerned with the nutritional needs of their pets. To meet nutritional requirements, pet food formulas can be selectively altered to vary the protein content, vitamin and mineral content, and caloric content. The altering of these ingredients when making a canned or "wet" pet food product has little effect on the texture and flavor of the pet food. The balance of these ingredients becomes more critical when making a dry food because a portion of the formula must be structural ingredients such as starch containing flours which are required to form a pellet. When making a dog biscuit pet food, the requirement that a portion of the formula be for structural ingredients becomes even more critical. Structural ingredients or gluten and starch containing flours form the dough matrix within a biscuit and maintain the texture and hardness of the biscuit after baking. Altering the nutritional ingredients in a biscuit formula can have an adverse effect on a biscuit. The alteration of these ingredients can effect the color, biscuit strength, the rise of the biscuit, and the hardness of the biscuit.

Common dog biscuits typically contain between about 60 to about 70 percent wheat flour, 10 percent soybean meal, 6 percent meat and bone meal, between 2 and 3 percent animal fat such as tallow, and 11 to 12 percent miscellaneous ingredients. These biscuits usually contain about 1.5 percent fiber and about 360 to 385 calories per 100 grams of biscuit. Typically dog biscuits contain between 20 and 22 percent protein. The majority of this protein is derived from the wheat flours used to make the dog biscuit.

The substitution of a portion of the wheat flour with other ingredients in a dog biscuit can be done to accomplish a variation in the protein content or caloric content of the dog biscuit. The substitution of wheat flour with a farinaceous flour can be useful in reducing the protein content of the dog biscuit, but might not sufficiently reduce a caloric content of the dog biscuit. Inert ingredients can be used as substitutes for wheat flour to reduce the caloric content of a dog biscuit. In either case, substitution of wheat flour in a biscuit formula creates problems in the manufacturing of the dog biscuit such adverse alterations to the texture and appearance of the final product which effect consumer acceptance of the product.

The problems that occur in manufacturing and baking dog biscuits with decreased wheat flour content include texture problems, undesirable color variations, and biscuit strength problems. The texture of dog biscuits is important to the product because biscuits are very useful in cleaning a dog's teeth. A texture that is too soft or too brittle does not provide enough abrasive action for cleaning the animal's teeth or does not conform to the tooth surface during chewing. It is often desirable that the texture of dog biscuits intended for older or "senior" dogs provide a softer chew. Undesirable color variations in a dog biscuit often do not alter the acceptability of the biscuits to the animal, but color variations are important to the animal's owner. Acceptance of the product by the animal's owner is increased when the biscuit has a healthy, appetizing appearance. A rich brown, but not dark, color is desirable to most pet owners purchasing dog biscuits. A biscuit which is too light in color or white does not appear cooked. A biscuit that is too dark in color appears "burned". Problems with biscuits are encountered when too much gluten containing wheat flour is removed from a biscuit formula and replaced with ingredients that do not aid in the development and strength of the biscuit dough. Such ingredients include fish meal, corn flour, and inert fibers. A decrease in the strength of the biscuit can lead to difficulties in the manufacturing of the biscuit, particularly during the forming of the biscuits.

U.S. Pat. No. 4,310,558 to Nahm discloses a formula to produce extruded pellets providing a balance of protein for adult dogs. The protein is balanced by mixing proteinaceous and farinaceous grains. Specifically, proteinaceous wheat flour is mixed with farinaceous flour such as corn flour. This patent also uses fish meal to give a more suitable protein combination not obtained with formulas containing only flour. The fish meal is added to increase the essential amino acids which are provided in high enough quantities by the flours alone. This patent is concerned with extrusion cooking of pellets as opposed to producing a biscuit.

An example of substitute ingredients for wheat flour is found in U.S. Pat. No. 3,365,297 to Burgess which discloses a method of making animal food, in this case pellets as opposed to biscuits, in which proteinaceous and farinaceous meals are combined. This mixture contains wheat, corn, meat, soy, and fish meal. The object of this invention is to produce food pellets that retain their particulate character upon hydration. The use of cold water in this patent is to effect pyrolysis of the starches. This patent does not involve the making of a nutritionally balanced, low calorie, dietetic biscuit.

U.S. Pat. No. 3,708,306 to Appleman reveals an animal food product combining various grains with corn flour and fish meal. Appleman is directed to the production of biscuits having a desirable color, protein enrichment, and a softer chew. This patent, however, is primarily directed at the use of psyllium flour in animal foods.

U.S. Pat. No. Des. 982,711 to Ellis discloses a biscuit with a stylized appearance of a bone. This patent reveals the use of gluten flour and corn meal together with other products in the making of the biscuit. This patent discusses the effect that this mixture has on the final color of the patent. The disclosure in this patent is not directed to producing a low calorie dietetic biscuit.

U.S. Pat. Nos. 2,827,377 to Frost, 3,438,780 to Singer, 4,212,896 to Brown, and 4,371,556 to Pitchon are each directed at the production of animal feed containing corn meal combined with another grain. The Frost patent is primarily concerned with the production of improved feed for poultry. Its formula uses corn meal with fish by-products to obtain a nutritious balance. The Singer patent is concerned with an improved process for making animal feed in which corn and wheat meals are combined. The Brown patent discloses numerous formulas including corn meal with other grains, all of which include molasses. The inclusion of molasses with various cereal products yields a chewy non-crumbly structure. The Pitchon patent includes a discussion of farinaceous and proteinaceous ingredients. This patent is primarily concerned with the inclusion of soy products in a palatable dog food.

Less active adult and senior dogs do not usually need as many calories as do younger dogs. It is desirable that low calorie biscuits intended for consumption by senior dogs provide a nutritionally balanced diet. A low calorie product must satisfy the animal's appetite. To provide a biscuit which is satisfying, but low in calories, a portion of the wheat flour used to make the biscuit must be removed and substituted with nonfunctional ingredients which are low in calories.

U.S. Pat. No. 4,287,220 to Pappas et al. discloses an essentially solid, free-flowing, blended composition containing cooked farinaceous food products and one or more of rice hulls or soybean hulls and peanut hulls. Other dietary solids such as cellulose fibers can be included as an inert ingredient. This patent concerns the preparation of an animal feed from products derived from waste by-products in food manufacturing operations. This patent does not concern the use of rice hulls or other waste products in the manufacturing of a biscuit. This disclosure is directed at animal feed compositions which are mixed, blended, and the bagged.

U.S. Pat. No. 3,767,423 to Tsantir et al. discloses a low calorie bread which is prepared by replacement of a portion of the flour used in the dough by a mixture of finely divided edible hulls of vegetable origin. Rice hulls and soybean hulls are designated as suitable ingredients for this purpose. This reference is concerned with the production of a bread containing a combination of hulls which are substituted for starch ingredients and reduce the calories of the bread. The formulas and examples disclose a bread which is smooth, light, and resilient in texture. This patent states in column 1 that the applicants are aware of non-nutritive food substances including, among other things, rice hulls, having been proposed for use separately, but not in conjunction with one another in making biscuits or crackers. No specific examples are given. This disclosure does not lead one to a suitable formula or method for incorporating rice hulls into a biscuit intended for animal consumption wherein the biscuit is nutritionally balanced and provides a concentration of rice hulls or other hulls which reduces the calories of the biscuit and provides a texture with teeth cleaning qualities during consumption.

U.S. Pat. No. 2,745,748 to McCashen discloses a process for making whole grained flours. The flours can be made from numerous identified cereal grains which have hulls attached to the starch of the flour. This patent is not concerned with the utilization of rice hulls or other vegetable hulls to reduce the caloric content of a dog biscuit.

U.S. Pat. No. 4,431,674 to Fulger et al. discloses a process for producing an all natural, enzyme-saccharide cereal derived from whole grain. This patent discusses the use of numerous cereal grains. The claimed process involves milling the whole cereal grain, which would include portions of the hull. Rice is identified as a cereal grain which can be used to make a cereal according to this patent. This patent is unconcerned with producing a baked dog biscuit which is reduced in calories and nutritionally balanced.

United Kingdom Pat. No. 290 811 discloses a pet food containing a balance of farinaceous and proteinaceous material. The pet food according to this invention contains a starch conditioner which is used to stabilize the moisture content of the food product. This patent is unconcerned with the production of a baked dog biscuit, but does disclose a formula containing soy hulls intended for use in a dog food made according to the claims of this patent.

The prior art does not disclose a formula nor process to produce dietetic dog biscuits for adult or older dogs in which the standard wheat flour content of the biscuit has been substituted in part by vegetable hulls to alter the balance of the biscuit's protein, fiber, caloric content, or combination of these properties. This invention provides a nutritionally balanced, dietetic dog biscuit which can be low in calories. This invention provides a product and its process to manufacture dog biscuits that are nutritionally balanced and contain vegetable hulls.

SUMMARY OF THE INVENTION

The invention is a baked product comprising ingredients to form a biscuit dough and a quantity of vegetable hulls, the baked product being a biscuit. The most desirable vegetable hulls are a member selected from the group consisting of rice hulls, barley hulls, oat hulls, soybean hulls, peanut hulls, and mixtures of these.

The invention includes a low calorie, dietetic dog biscuit which is nutritionally balanced and has a composition comprising a mixture of blended wheat flours and vegetable hulls. In certain embodiments of this invention fish meal is added to achieve a dog biscuit with a high quality protein content in conjunction with a lower caloric content. This mixture necessitates the use of lower than normal batch water temperatures during baking to achieve a "spring" or rise in the biscuits. Tallow can be added as an aroma enhancing ingredient to obtain better animal acceptance. A high concentration of vitamins can be added to this biscuit. Unlike conventional biscuit formulas no salt is added in the most preferred embodiment of this invention. The most preferred embodiments of this invention use rice hulls for the inert ingredient.

Certain embodiments of this invention provide reduced calorie dog biscuits in which fish meal and rice hulls are substituted for a portion of the wheat flour in the biscuit formula. This embodiment provides a dog biscuit nutritionally balanced for senior dogs that is lower in total protein content, but higher in the quality of protein or essential amino acids. These embodiments combine low protein containing vegetable hulls with proteinaceous wheat flours and fish meal such that the total overall protein content is reduced in the biscuit formula. The inclusion of a high protein containing ingredient, such as fish meal, provides ample "quality" protein that contains essential amino acids required by an animal. The total protein content of these embodiments can be selectively adjusted to remain below that of conventional biscuits.

DETAILED DESCRIPTION OF THE INVENTION

This invention is a low calorie, dietetic dog biscuit which is nutritionally balanced and has a composition comprising a mixture of blended wheat flours and vegetable hulls. The ratio of vegetable hulls to wheat flour in the biscuit composition of this invention can be selectively varied to alter the caloric content, protein content, and fiber content of the dog biscuit. Other ingredients can be included in the composition including a high concentration of vitamins, yeast culture, fish meal, farinaceous flours, and other grain products. For purposes of this invention the term vegetable hulls includes cereal hulls.

The presence of rice hulls in the most preferred embodiments of the dog biscuits of this invention provides an animal with a desirable dietary fiber supplement and an abrasive material that aids in cleaning the animal's teeth. Rice hulls are compatible with a biscuit dough because they have favorable water absorbtion characteristics when compared to other vegetable hulls and fibrous materials. Rice hulls provide for a final product having a desirable biscuit hardness or "chew".

The wheat flour used to make a dog biscuit contains a high starch content and as such provides the dog biscuit with a major portion of its caloric content. Replacement of from about 15 to up to about 30 percent of the wheat flour of a dog biscuit with vegetable hulls or other fibrous materials reduces the total caloric content of the dog biscuit and leaves enough starch and gluten containing flour in a dough to form an acceptable dough matrix in the baked biscuit. For purposes of this invention percentages of vegetable hulls in biscuit formulas are based on the combined weight of all dry ingredients including the vegetable hulls. In formulas having tallow, the weight of the tallow is included as part of the weight of the dry ingredients.

The use of rice hulls in a biscuit as a fibrous ingredient which is substituted for a portion of the biscuit's wheat flour, provides advantages over other vegetable hulls or fibrous material. Fibrous materials such as cellulose, soy hulls, peanut hulls, and other cellulose containing products including rice hulls absorb more water than do wheat flours.

Biscuit doughs containing rice hulls, unlike biscuit doughs containing the other fibrous materials listed above, require less water for dough formation. This result occurs with rice hulls because rice hulls absorb less moisture than the other listed fibrous materials. This desirable water absorbtion characteristic of rice hulls is due at least in part to the higher starch content of the commercially supplied rice hulls as compared to other vegetable hulls or fibrous materials. Another reason for the low water absorbtion characteristics of rice hulls is that rice hulls contain about 2.2 percent cutin. Cutin is a water repellent material found in the outer layers of rice hulls and other plants. Since rice hulls absorb less water, there is less competition for the added water with the wheat flour. For this reason rice hulls can be substituted for flour in a high concentration as a nonfunctional or inert substance.

Rice hulls disrupt the dough matrix of a biscuit less than other fibrous materials or vegetable hulls because of their low bulk density and low swelling properties. Fiber present between starch and protein molecules causes weak points in the dough structure of a biscuit which result in less cohesive bonding between these molecules. A high fiber content in a biscuit dough produces a hard, brittle, and flat biscuit. Rice hulls, because of their low bulk density and low swelling properties are less disruptive of a biscuit's dough matrix or structure than is a pure cellulose or wood pulp product such as Solka-Floc ®, which is sold by the James River Company, Berlin-Gorham Group, Berlin, N.H. 03570. The starch molecules in rice hulls interact with the starch and protein molecules of the other dough ingredients to allow cohesive bonding. Table I illustrates the percent of starch content between rice hulls and other vegetable hulls for comparative purposes.

TABLE I

| STARCH COMPOSITION OF HULLS | |
|---|---|
| Sample | Starch % |
| Rice hull | 11.2 |
| Barley hull | 8.4 |
| Oat hull | 1.2 |
| Soybean hull | 5.0 |
| Peanut red skins | 0.74 |

The actual starch content of rice hulls can vary depending upon the purity of the product and amount of bran adhering to the hulls.

Table II illustrates for comparative purposes the moisture adsorbtion and retention qualities of various vegetable hulls. As illustrated by the data in this table, rice hulls adsorb and retain water at just below twice their weight and swell to only about one and one-half times their normal size in water. The water adsorbtion, retention, and swelling characteristics of rice hulls are less than that encountered with many other vegetable hulls. These favorable characteristics allow for the easy formation of a biscuit dough containing a high percentage of rice hulls and reduces the quantity of water required to develop a dough or the need for higher than average baking temperatures to evaporate the water. Additionally, the resulting baked product has an acceptable dough matrix because rice hulls during baking shrink less in size do to their low swelling properties and leave a smaller cavity in the surrounding dough than do other vegetable hulls.

TABLE II

| BULK DENSITY AND HYDRATION CAPACITY OF HULLS | | | | |
|---|---|---|---|---|
| | | | | Moisture Rention g/g |
| Fiber | Bulk Volume | Swelling | Moisture Absorbtion | Temperature of Drying |
| Material | ml/g | % | g/g | <35° | 100° C. |
| Rice hull | 2.1 | 150 | 1.7 | 1.9 | 1.9* |
| Barley hull | 2.8 | 160 | 3.2 | 3.5 | 2.6 |
| Oat hull | 2.4 | 120 | 2.3 | 2.6 | 2.2 |
| Soybean hull | 2.0 | 480 | 3.9 | 5.8 | 3.4 |
| Peanut red Skins | 4.8 | 140 | 1.2 | 5.0 | 4.8 |

*moisture retention is the same through these baking and drying temperatures.

Rice hulls are desirable for use with this invention, but this invention is not limited to the use of rice hulls.

Rice hulls as used in the most preferred embodiments of this invention are commercially available and provide a dietary fiber supplement for the biscuits made according to this invention. For example, a biscuit formula wherein rice hulls comprise 15 percent of the final product's weight give the final product approximately an 8 to 9 percent fiber content. This level of fiber content usually is deleterious to the formation of a dough, but contrary to expectation a biscuit formula containing between 15 and 30 percent rice hulls produces an extensible dough suitable for machining. Workable dough can be made with rice hulls or other vegetable hulls in concentrations greater than 30 percent.

It has also been discovered that rice hulls in a biscuit formula have an insignificant effect on the water adsorption of the starch containing ingredients during the formation of dough. Rice hulls in a biscuit dough easily release moisture during baking and permit the biscuit to "rise" during baking. Rice hulls, unlike pure cellulose products, produce a rich, tan biscuit after baking without the addition of artificial colors.

In the most preferred embodiment of this invention a combination of a high strength wheat flour and a medium strength wheat flour is used. The strength of a flour refers to its gluten content. Gluten is the protein present in a flour which adds strength to a dough made of that flour. A high gluten flour contains approximately 12 to 15 percent total protein content. Rice hulls unlike gluten flours do not add strength to the dough. When rice hulls are mixed with wheat flours in quantities of up to approximately 30 percent of the total weight of the dry ingredient in the formula, the strength providing protein or gluten content of the dough is decreased. For this reason a sufficient quantity of high strength wheat flour is desirable to include in a biscuit's formula so as to produce a machinable dough.

Varying the mixtures of proteinaceous flour and rice hulls also effects the hardness or the "chew" of the final product. A high gluten containing biscuit results in a hard final product. A hard biscuit has a good abrasive action against the teeth and gums. A soft final product is less abrasive, but adheres well to tooth and gum surfaces during chewing. Selectively blending flour and vegetable hulls can result in a vegetable biscuit which is soft in chew, but abrasive enough to be an effective tooth cleaning agent for dogs. It is often desirable that biscuits intended to senior dogs have a soft chew to allow for easy consumption of the biscuit by the animal.

Substituting farinaceous or low protein containing components such as flours, fibers, and other ingredients for part of the wheat flour contained in normal dog biscuits can lead in some embodiments of this invention to a brittle product. Brittle biscuits experience excessive breakage during handling and packaging. To some extent breakage can be reduced by selectively increasing the amount of high gluten flour in the wheat flour blend. The use of fibers and farinaceous flours, to form a biscuit dough generally results in a thin biscuit. Farinaceous flours can include corn flour, corn meal, oat flour, barley flour, potato flour and others.

Additional "spring" an be obtained in biscuits during baking by using a batch water of a lower than normal temperature or in the range of between about 110° F. and about 125° F. The lower temperature of the batch water causes the dough upon entering the oven to retain its moisture for a longer period of time before it evaporates. As the water is heated in the oven it forms steam and expands. The prolonged time for evaporation of the cold water in a dough formula provides additional "spring" or an increased thickness which allows for better stacking properties and break resistance.

Replacing up to about 30 percent of the total flour content used in conventional dog biscuits with rice hulls allows nonvegetable-source, protein-containing ingredients to be selectively added to the biscuit formula to enhance the "quality" and balance of the protein present in the final biscuit product. Animal derived, proteinaceous components include chicken meal, fish, fish meal, meat, and meat by-products. The addition of these ingredients can be made in various selected concentrations for different embodiments of dog biscuits made according to this invention. Varying concentrations can provide a balanced, nutritious biscuit which contains the same or less "total" protein than does a conventional wheat dog biscuits. Typically, the total protein content in dog biscuits according to this invention is reduced to between about 18 and about 20 percent of the weight of the dog biscuit.

Quality of protein refers to the protein content that provides essential amino acids for the consuming animal. By using various soybean or animal source, proteinaceous ingredients, the final mixture of protein present in the dog biscuit can contain higher amounts of amino acids than found in common wheat biscuits. For example, the protein obtained from wheat flour is low in lysine, an essential amino acid for dogs, but fish meal and meat meal are high in lysine. By varying the proportion of ingredients for different embodiments of this invention, biscuits can be obtained that provide a low total protein content with a high quality of protein. A lower total protein content is desirable in biscuits intended for consumption by older or senior dogs. These senior dogs do not metabolize protein as efficiently as do younger dogs. Therefore, the protein level is reduced, but the quality of the protein is increased.

Other ingredients can be added to the dough of this invention to enhance the nutritional qualities of the final product. These ingredients include vitamin additives as well as mineral supplements. Vitamins and minerals can be selectively added in amounts higher than those established for dogs by The National Research Council of the National Academy of Sciences, Number 8, Nutrient Requirements of Dogs (Rev. 1974). A higher quantity of vitamins and minerals in the dog biscuits ensures that a dog receives an adequate amount of these ingredients to sustain good health and ensures that an adequate amount of active vitamin remains present in the dog biscuit after prolonged storage. Vitamin supplements used in this invention are commercially available as additives from numerous sources. Calcium carbonate is added in the most preferred embodiments in addition to bone meal to provide adequate calcium for the animal. Other nutrients and minerals can be selectively added.

The most desirable embodiments of this invention include tallow for a number of significant purposes. The addition of tallow results in a final biscuit with a softer chew than can be obtained without tallow. Tallow also enhances the aroma of the biscuit and increases the acceptability of the final product by animals. Tallow allows the pressed dough to release easily from biscuit forming cups or molds and other machinery. This characteristic allows for a higher pressure to be used with the molds. Higher operating pressures for molds produce a better biscuit appearance. Tallow can be included in reduced calorie formulations for biscuits that contain 10 percent fewer calories than standard dog biscuits. Other fats could be used as substitutes for tallow. Tallow, however, has a proven acceptability as a flavor and aroma enhancer in dog biscuits and has an acceptable shelf life during storage of the product at room temperature.

Salt is an ingredient frequently found in biscuits for both animal and human consumption. It is generally used to flavor to the final product. Traditional dog biscuit formulas often contain over 1 percent salt. In certain embodiments of this invention the total amount of salt present in the biscuit is reduced to approximately 0.25 percent of the weight of the biscuit. In these embodiments no salt is added to the biscuit formula. The salt present in the biscuit is naturally occurring in the biscuit's ingredients. The lower level of salt is beneficial for animals for the same reasons that it is beneficial for humans. Excess salt can give rise to hypertension and fluid retention in dogs. In the most preferred embodiments of this invention no salt is added to the biscuit formula.

The production of biscuits, according to this invention, begins with the blending of the minor dry ingredients, such as soybean meal, fish meal, meat, and bone meal. The flours are then mixed in to this blend. Mixing is continued until all dry ingredients are evenly distributed. Water is added with mixing to begin the formation of a dough. Any fat, such as tallow, is then added to the dough and mixed to a smooth, even consistency. The dough mass is then transferred to a suitable apparatus for forming dough. In the most preferred embodiment, the dough is formed and shaped to resemble a stylized bone. The shape of the dough pieces is not generally important to the final product, but can effect baking characteristics. After shaping, the dough pieces are transferred to a convection oven.

It appears that the water absorbed by the rice hulls is not as bound as the water which is absorbed by the wheat flour. The water absorbed by the wheat flour is used to develop gluten. This water is more bound and does not evaporate as easily during baking. Table III illustrates this phenomenon.

TABLE III

|  | Control[2] formula | Rice hull formula |
|---|---|---|
| COMPARATIVE MOISTURE CONTENTS[1] | | |
| Inherent water | 10% | 10% |
| Added water dough | 23–24% | 25–26% |
| Total water dough | 33–34% | 35–36% |
| OVEN TEMPERATURES[3] | | |
| Zone 1 | 450° F. | 440° F. |
| Zone 2 | 475° F. | 475° F. |
| Zone 3 | 500° F. | 475° F. |
| Zone 4 | 500° F. | 475° F. |
| Zone 5 | 400° F. | 375° F. |
| Zone 6 | 375° F. | 375° F. |
| Final moisture | 8.5% | 6.5% |

[1]Percents are by weight.
[2]The control formula is the same as the rice hull formula except that additional wheat flour is used to replace the rice hulls.
[3]Total baking time was between 10 to 11 minutes.

In most embodiments of this invention a multizone oven is used in which temperatures vary between 250° F. and 550° F. and average about 450° F. Generally, baking lasts between 6 and 14 minutes. After baking it is beneficial to further dry the biscuits by applying a lower temperature forced air to or around the baked dough pieces. A final step of applying dielectric energy can be used to further reduce the moisture content of the biscuit. The biscuits can then be packaged and are ready for consumption.

This invention can be further understood from the examples below, but is not limited to the examples.

EXAMPLE I

This example represents the preferred embodiment of the invention. A dietetic dog biscuit is produced which is reduced in total protein content and calories when compared to conventional wheat flour dog biscuits. The ingredients and their weights are in Table IV.

TABLE IV

| INGREDIENTS | POUNDS | OUNCES |
|---|---|---|
| Hard Wheat Flour | 545 | 0 |
| Medium Blend Flour | 300 | 0 |
| Rice Hulls (20–80)[1] | 200 | 0 |
| Soybean Meal | 50 | 0 |
| Meat and Bone Meal | 100 | 0 |
| Yeast Culture | 30 | 0 |
| Fish Meal | 10 | 0 |
| Bone Meal | 5 | 0 |
| Calcium Carbonate | 2 | 0 |
| Vitamin Premix[2] | 0 | 6 |
| Tallow | 30 | 0 |
| Water | 400 | 0 |

[1]Supplied by Riceland Foods, P.O. Box 927, Stuthgart, Arkansas 72160. This supplier identifies its grades of rice hulls by two numbers. The first number represents the standard U.S. screen mesh through which 100 percent of the rice hulls pass. The second number represents the standard U.S. screen mesh through which 100 percent of the rice hulls do not pass.
[2]Suitable vetinary vitamins premixes are provided by Hoffman LaRoche 601 Benm. Salisbury, Maryland 21801 and Duphar Nutrition, Inc., 2 East Madison, Wakeegun, Illinois 60085.

The rice hulls, soybean meal, meat and bone meal, wheat meal, yeast, fish meal, bone meal, calcium carbonate, and vitamin premix are blended together in a mixer. To this blend the hard wheat flour and medium blend flour are added with further mixing until a dough begins to form. As the dough is forming the tallow is added and mixing continues until the uniform homogenous dough is achieved. The dough is then rolled and pressed into biscuit pieces, which are in turn transferred to a conveyor belt. The conveyor belt transports the dough pieces into a multi-stage convection oven. The dough pieces are baked at an average temperature of 450° F. for 11 minutes. A post drying stage follows the baking during which forced air at 100° F. is maintained for approximately 3 minutes. The biscuits are then conveyed to a packaging unit and are drop-packaged into sacks. Biscuits according to this embodiment contain approximately 320 to 330 calories per 100 grams of biscuit.

EXAMPLE II

This embodiment produces a dietetic dog biscuit which is not only reduced in total protein content, but the quality of the protein is increased as compared to conventional dog biscuits in regard to the essential amino acid content. The ingredient and their weights are in Table V.

TABLE V

| INGREDIENTS | WEIGHT | |
|---|---|---|
|  | LBS. | OZS. |
| Hard Wheat Flour | 400 |  |
| Medium Blended Flour | 340 | 0 |
| Rice Hulls (20–80) | 230 | 0 |
| Corn Meal | 40 | 0 |
| Soybean Meal | 70 | 0 |
| Fish Meal | 120 | 0 |
| Tallow | 32 | 0 |
| Meat and Bone Meal | 20 | 0 |
| Calcium Carbonate | 17 | 0 |
| Citric Acid | 3 | 10 |
| Vitamin Premix | 1 | 0 |
| Salt | 1 | 0 |
| Water | 410 | 0 |

The process to produce this embodiment of the invention is the same as that used in Example 1. This embodiment produces a dietetic dog biscuit low in overall protein content and reduced in caloric content. This embodiment also has a soft chew that is desirable for feeding senior dogs and has tooth cleaning characteristics.

EXAMPLE III

This example produces a dietetic dog biscuit, which is reduced in calories and protein content and also has a moderately increased level of essential amino acids. The ingredients and their weights are in Table VI.

TABLE VI

| INGREDIENTS | WEIGHT LBS. | OZS. |
|---|---|---|
| Medium Wheat Flour | 710 | 0 |
| Corn Meal | 40 | 0 |
| Rice Hulls | 230 | 0 |
| Soybean Meal | 70 | 0 |
| Fish Meal | 80 | 0 |
| Tallow | 32 | 0 |
| Meat and Bone Meal | 20 | 0 |
| Calcium Carbonate | 17 | 0 |
| Citric Acid | 3 | 10 |
| Vitamin Premix | 1 | 0 |
| Salt | 1 | 0 |
| Water | 435 | 0 |

This example is prepared in the same manner as that of Example 1. Baking lasts for 14 minutes.

EXAMPLE IV

This example produces a dietetic dog biscuit which is low in caloric content and approximately the same in protein content as a conventional dog biscuit. The protein content of this dietetic dog biscuit is high in quality because of its high animal protein content. The ingredients and their weights are in Table VII.

TABLE VII

| INGREDIENTS | POUNDS | OUNCES |
|---|---|---|
| Hard Wheat Flour | 740 | 0 |
| Corn Meal | 40 | 0 |
| Rice Hulls | 230 | 0 |
| Soybean Meal | 70 | 0 |
| Meat and Bone Meal | 20 | 0 |
| Fish Meal | 120 | 0 |
| Calcium Carbonate | 20 | 0 |
| Citric Acid | 3 | 10 |
| Malted Barley Flour | 1 | 10 |
| Vitamin Premix | 0 | 6 |
| Tallow | 32 | 0 |
| Water | 435 | 0 |

The process for this example is the same as that of Example 1. The malted barley flour in this example is a low protein containing component and introduces amylase to the biscuit dough. Amylase hydrolyzes the starch in the dough and thereby makes the dough more "workable".

EXAMPLE V

This example produces a dietetic dog biscuit, which is reduced in calories and protein content and also has a moderately increased level of essential amino acids. The ingredients and their weights are in Table VIII.

TABLE VIII

| INGREDIENTS | WEIGHT LBS. | OZS. |
|---|---|---|
| Blended Wheat Flour | 360 | 0 |
| Medium Flour | 350 | 0 |
| Corn Meal | 40 | 0 |
| Peanut Hulls | 250 | 0 |
| Soybean Meal | 70 | 0 |
| Fish Meal | 80 | 0 |
| Tallow | 32 | 0 |
| Meat and Bone Meal | 20 | 0 |
| Calcium Carbonate | 17 | 0 |
| Citric Acid | 3 | 10 |
| Vitamin Premix | 1 | 0 |
| Salt | 1 | 0 |
| Water | 535 | 0 |

This example is prepared in the same manner as that of Example I except that more water is required to form the dough. Baking lasts for 14 minutes.

EXAMPLE VI

This example produces a dietetic dog biscuit containing soy hulls to reduce the total caloric content of the resultig biscuits. The ingredients and their weights are in Table IX.

TABLE IX

| INGREDIENTS | WEIGHT LBS. | OZS. |
|---|---|---|
| Blended Wheat Flour | 360 | 0 |
| Medium Blended Flour | 340 | 0 |
| Soybean Hulls | 300 | 0 |
| Soybean Meal | 70 | 0 |
| Fish Meal | 80 | 0 |
| Tallow | 32 | 0 |
| Meat and Bone Meal | 20 | 0 |
| Calcium Carbonate | 17 | 0 |
| Citric Acid | 3 | 0 |
| Vitamin Premix | 1 | 0 |
| Salt | 1 | 0 |
| Water | 550 | 0 |

This example is prepared in the same manner as that of Example I except that more water is required to form the dough.

EXAMPLE VII

This example produces a dietetic dog biscuit suitable for senior dogs which is low in caloric content and approximately the same in protein content as a conventional dog biscuit. The protein content of this dietetic dog biscuit is high in quality because of its high animal protein content. The ingredients and their weights are in Table X.

TABLE X

| INGREDIENTS | POUNDS | OUNCES |
|---|---|---|
| Hard Wheat Flour | 740 | 0 |
| Corn Meal | 40 | 0 |
| Rice Hulls | 130 | 0 |
| Soy Hulls | 100 | 0 |
| Soybean Meal | 70 | 0 |
| Meat and Bone Meal | 20 | 0 |
| Fish Meal | 120 | 0 |
| Calcium Carbonate | 20 | 0 |
| Citric Acid | 3 | 10 |
| Malted Barley Flour | 1 | 10 |
| Vitamim Premix | 0 | 6 |
| Tallow | 32 | 0 |
| Water | 500 | 0 |

The process for this embodiment is the same as that of Example I.

EXAMPLE VIII

This example is similar to Example VII except that a pure cellulose material, Solka-Floc ®, is substituted for a portion of the soy hulls. The protein content is also reduced by decreasing the concentration of fish meal in the formula. The ingredients and their weights are in Table XI.

TABLE XI

| INGREDIENTS | POUNDS | OUNCES |
| --- | --- | --- |
| Hard Wheat Flour | 740 | 0 |
| Rice Hulls | 130 | 0 |
| Solka-Floc ® | 25 | 0 |
| Soy Hulls | 65 | 0 |
| Soybean Meal | 70 | 0 |
| Meat and Bone Meal | 20 | 0 |
| Fish Meal | 80 | 0 |
| Calcium Carbonate | 20 | 0 |
| Citric Acid | 3 | 10 |
| Malted Barley Flour | 1 | 10 |
| Vitamin Premix | 0 | 6 |
| Tallow | 32 | 0 |
| Water | 565 | 0 |

The process for this example is the same as that of Example I.

What is claimed is:

1. A dietetic dog biscuit, comprising:
   (a) ingredients to form a dietetic dog biscuit dough, wherein said dough contains a blend of high gluten strength wheat flour and medium gluten strength wheat flour; and
   (b) a quantity of rice hulls of about 30 percent by weight of all dry ingredients used to form said biscuit dough, whereby a dietetic dog biscuit is provided containing approximately 8-9% fiber content, which has reduced calories and provides a texture with teeth cleaning qualities during consumption.

2. A baked dietetic dog biscuit comprising:
   (a) a quantity of vegetable hulls;
   (b) a wheat flour;
   (c) a low protein containing component in an amount sufficient to provide a brittle product, said low protein containing component being a member selected from the group consisting of corn flour, corn meal, oat flour, barley flour, potato flour, and mixtures of these;
   (d) an animal derived proteinaceous component in an amount sufficient to provide a balanced nutritious total protein content, said proteinaceous component being a member selected from the group consisting of chicken meal, fish meal, meat, fish, meat by-products, and mixtures of these, said baked dietetic dog biscuit having a total protein content of between about 18 and 20 percent, wherein the ratio of vegetable hulls to flour is in an amount sufficient to alter the caloric content, protein content and fiber content of the dog biscuit.

3. The baked dietetic dog biscuit of claim 2 further comprising:
   (e) tallow; and
   (f) soybean meal.

4. The baked dietetic dog biscuit of claim 3 further comprising:
   (g) an active yeast culture.

5. The baked dietetic dog biscuit of claim 2, wherein said wheat flour is between 45 percent and 60 percent of the biscuit.

6. The baked dietetic dog biscuit of claim 2 wherein said vegetable hulls are a members selected from the group consisting of rice hulls, barley hulls, oat hulls, soybean hulls, peanut hulls and mixtures of these.

7. The baked dietetic dog biscuit of claim 6 wherein said vegetable hulls are rice hulls.

8. The baked dietetic dog biscuit of claim 7 wherein said quantity of said rice hulls is up to 30 percent by weight of all dry ingredients used to form said biscuit dough including said rice hulls.

9. A baked dietetic dog biscuit comprising:
   (a) wheat flour;
   (b) a quantity of vegetable hulls, said vegetable hulls being a member selected from a group consisting of rice hulls, barley hulls, oat hulls, soybean hulls, peanut hulls, and mixtures of these; and
   (c) an animal derived proteinaceous component in an amount sufficient to provide a balanced nutritious total protein content, said proteinaceous component being a member selected from the group consisting of chicken meal, fish meal, meat, fish, meat by-products, and mixtures of these, wherein said baked dietetic dog biscuit has a caloric content between 320 and 330 calories per 100 grams of said biscuit, and wherein the ratio of vegetable hulls to flour is in an amount sufficient to alter the caloric content, protein content and fiber content of the dog biscuit.

10. The baked dietetic dog biscuit of claim 9 further comprising:
    (d) tallow; and
    (e) soy bean meal.

11. The baked dietetic dog biscuit of claim 10 further comprising:
    (f) an active yeast culture.

12. The baked dietetic dog biscuit of claim 11, wherein wheat flour is about 45 weight percent to about 60 weight percent of the biscuit.

13. The baked dietetic dog biscuit of claim 12, wherein said vegetable hulls are in an effective amount up to about 30 percent by weight of all dry ingredients used to form said biscuit dough including said vegetable hulls.

14. The baked dietetic dog biscuit of claim 13 wherein said vegetable hulls are rice hulls.

15. A baked dietetic dog biscuit comprising:
    (a) wheat flour, said wheat flour being between 45 percent and 60 percent by weight of all dry ingredients used to form a dough;
    (b) rice hulls, said rice hulls being in an effective amount up to 30 percent of all dry ingredients used to form a dough;
    (c) an animal derived, proteinaceous component in an amount sufficient to provide a balanced nutritious total protein content, said proteinaceous component being a member selected from the group consisting of chicken meal, fish meal, meat, fish, meat by-products, and mixtures of these; and
    (d) tallow;

wherein said baked dietetic dog biscuit has a caloric content between 320 and 330 calories per 100 grams of said biscuit.

* * * * *